US011967451B2

(12) United States Patent
Ikeda et al.

(10) Patent No.: US 11,967,451 B2
(45) Date of Patent: Apr. 23, 2024

(54) ELECTRONIC DEVICE

(71) Applicant: SHINDENGEN ELECTRIC MANUFACTURING CO., LTD., Tokyo (JP)

(72) Inventors: Kosuke Ikeda, Saitama (JP); Yoshiaki Hiruma, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 486 days.

(21) Appl. No.: 17/255,951

(22) PCT Filed: Jun. 29, 2018

(86) PCT No.: PCT/JP2018/024766
§ 371 (c)(1),
(2) Date: Dec. 23, 2020

(87) PCT Pub. No.: WO2020/003483
PCT Pub. Date: Jan. 2, 2020

(65) Prior Publication Data
US 2021/0272746 A1 Sep. 2, 2021

(51) Int. Cl.
*H01F 27/30* (2006.01)
*H01F 30/06* (2006.01)

(52) U.S. Cl.
CPC ........... *H01F 27/306* (2013.01); *H01F 30/06* (2013.01)

(58) Field of Classification Search
CPC ...... H01F 27/306; H01F 30/06; H01F 27/327; H01F 2027/2819; H01F 30/10; H01F 27/2804
See application file for complete search history.

(56) References Cited

U.S. PATENT DOCUMENTS

2007/0290784 A1 12/2007 Nesse et al.
2010/0102416 A1* 4/2010 Ashrafzadeh ....... H01F 17/0033 336/212
(Continued)

FOREIGN PATENT DOCUMENTS

CN 102077307 A 5/2011
CN 207381409 U * 5/2018
(Continued)

OTHER PUBLICATIONS

Office Action for Japanese Patent Application 2020-526844 dated Apr. 5, 2022 with English translation from Global Dossier.
(Continued)

*Primary Examiner* — Bickey Dhakal
*Assistant Examiner* — Matthew T Sarles
(74) *Attorney, Agent, or Firm* — Ladas & Parry, LLP

(57) ABSTRACT

An electronic device has a primary coil 10; a secondary coil 20 disposed to face the primary coil 10; a primary-side electronic element 110 electrically connected to the primary coil 10; and a secondary-side electronic element 210 electrically connected to the secondary coil 20. The primary coil 10 has a primary-side first coil 10*a* that is provided on another side of the secondary coil 20, and a primary-side second coil 10*b* that is provided on one side of the primary-side first coil 10*a*. A connecting part 19 connecting the primary-side first coil 10*a* and the primary-side second coil 10*b* is provided and passes through a space of the secondary coil 20.

6 Claims, 18 Drawing Sheets

(56) References Cited

U.S. PATENT DOCUMENTS

| | | | | |
|---|---|---|---|---|
| 2011/0037405 | A1 | 2/2011 | Suganuma et al. | |
| 2011/0228507 | A1* | 9/2011 | Yin | H05K 1/18 361/811 |
| 2021/0265103 | A1* | 8/2021 | Ikeda | H01F 27/2847 |
| 2021/0272748 | A1* | 9/2021 | Ikeda | H01F 27/29 |
| 2021/0272749 | A1* | 9/2021 | Ikeda | H01F 27/29 |

FOREIGN PATENT DOCUMENTS

| | | | | |
|---|---|---|---|---|
| EP | 2284847 | A1 * | 2/2011 | H01F 27/2804 |
| EP | 2284847 | A1 | 2/2011 | |
| JP | 2004253732 | A * | 9/2004 | |
| JP | 2004253732 | A | 9/2004 | |
| JP | 2008502166 | A | 1/2008 | |
| JP | 2010123898 | A | 6/2010 | |
| JP | 2012104724 | A | 5/2012 | |
| JP | 2012231616 | A | 11/2012 | |
| JP | 2015159174 | A | 9/2015 | |
| JP | 2017038053 | A | 2/2017 | |
| WO | 2009131059 | A1 | 10/2009 | |

OTHER PUBLICATIONS

Partial Supplementary European Search Report from EP app. no. 18924813.1, dated Jan. 24, 2022, all pages.

International Search Report in the international application No. PCT/JP2018/024766, dated Sep. 25, 2018.

Written Opinion of the International Searching Authority in the international application No. PCT/JP2018/024766, dated Sep. 25, 2018 and English translation provided by Google Translate.

Office Action from corresponding Chinese Patent Application No. 201880095120.0 dated Oct. 18, 2023 with search report and its English translation from Global Dossier.

* cited by examiner

ELECTRONIC DEVICE

CROSS-REFERENCE TO RELATED APPLICATION

The present application is the U.S. national phase of PCT Application No. PCT/JP2018/024766 filed on Jun. 29, 2018, the disclosure of which is incorporated herein by reference in its entirety.

TECHNICAL FIELD

The present invention relates to an electronic device that has a primary coil and a secondary coil.

BACKGROUND ART

Conventionally, a transformer that has a primary coil and a secondary coil is known. For example, JP 2008-502166 A discloses that a primary coil, a secondary coil, and a core are included, and coil layers of the secondary coil are wound to be superimposed onto each other, in principle, in a direction that is parallel to a plane of the primary coil. More specifically, the primary coil is constituted of one layer, the secondary coil is constituted of multiple layers, and an insulating material is provided between both.

As described above, in an aspect in which a primary coil and a secondary coil are superimposed onto each other via an insulating material, manufacture can be easily performed, but there has been room for improvement in transmission efficiency in a transformer.

SUMMARY OF INVENTION

Problem to be Solved by Invention

The present invention provides an electronic device that can be reduced in size, and can also enhance transmission efficiency in a transformer.

Means for Solving Problem

[Concept 1]

An electronic device may comprise:

a primary coil;

a secondary coil disposed to face the primary coil;

a primary-side electronic element electrically connected to the primary coil; and a secondary-side electronic element electrically connected to the secondary coil, wherein the primary coil may have a primary-side first coil that is provided on another side of the secondary coil, and a primary-side second coil that is provided on one side of the primary-side first coil, and a connecting part connecting the primary-side first coil and the primary-side second coil may be provided and may pass through a space of the secondary coil.

[Concept 2]

In the electronic device according to concept 1, the secondary coil may have a secondary coil part and a pair of secondary-side extension parts that extend from both ends of the secondary coil part, and the connecting part may pass through the space of the secondary coil between the both ends of the secondary coil part or between the pair of the secondary-side extension parts.

[Concept 3]

The electronic device according to concept 1 or 2 may further comprise a coil sealing part sealing the primary coil, the secondary coil, and the connecting part.

[Concept 4]

In the electronic device according to any one of concepts 1 to 3, the primary-side electronic element may have a primary-side first electronic element and a primary-side second electronic element provided on one side relative to the primary-side first electronic element, the primary-side first electronic element may be electrically connected to the primary-side first coil, and the primary-side second electronic element may be electrically connected to the primary-side second coil.

[Concept 5]

In the electronic device according to concept 4, the primary-side first electronic element may be provided on a primary-side first extension part that extends from the primary-side first coil, or the primary-side second electronic element may be provided on a primary-side second extension part that extends from the primary-side second coil.

[Concept 6]

The electronic device according to any one of concepts 1 to 5 may further comprise a primary-side sealing part sealing the primary-side electronic element, or a secondary-side sealing part sealing the secondary-side electronic element.

[Concept 7]

The electronic device according to any one of concepts 1 to 6 may further comprise a first electronic module having the primary-side electronic element, a primary-side substrate on which the primary-side electronic element is provided and a primary-side sealing part sealing the primary-side electronic element, or a second electronic module having the secondary-side electronic element, a secondary-side substrate on which the secondary-side electronic element is provided and a secondary-side sealing part sealing the secondary-side electronic element.

[Concept 8]

In the electronic device according to any one of concepts 1 to 7, the primary-side first coil or the primary-side second coil may be made from a lead frame.

Effect of Invention

As an aspect of the present invention, in a case where an aspect where the primary-side electronic element that is electrically connected to the primary coil and the secondary-side electronic element that is electrically connected to the secondary coil are provided, the primary coil has the primary-side first coil that is provided on the other side of the secondary coil, and the primary-side second coil that is provided on the one side of the secondary coil, and the connecting part connecting the primary-side first coil and the primary-side second coil is provided and passes through the secondary coil has been employed, a size of an electronic device can be reduced. Furthermore, the primary-side first coil and the primary-side second coil can be provided to sandwich the secondary coil, and therefore transmission efficiency in a transformer can also be enhanced.

EMBODIMENT OF INVENTION

First Embodiment

<<Configuration>>

Figure 3:
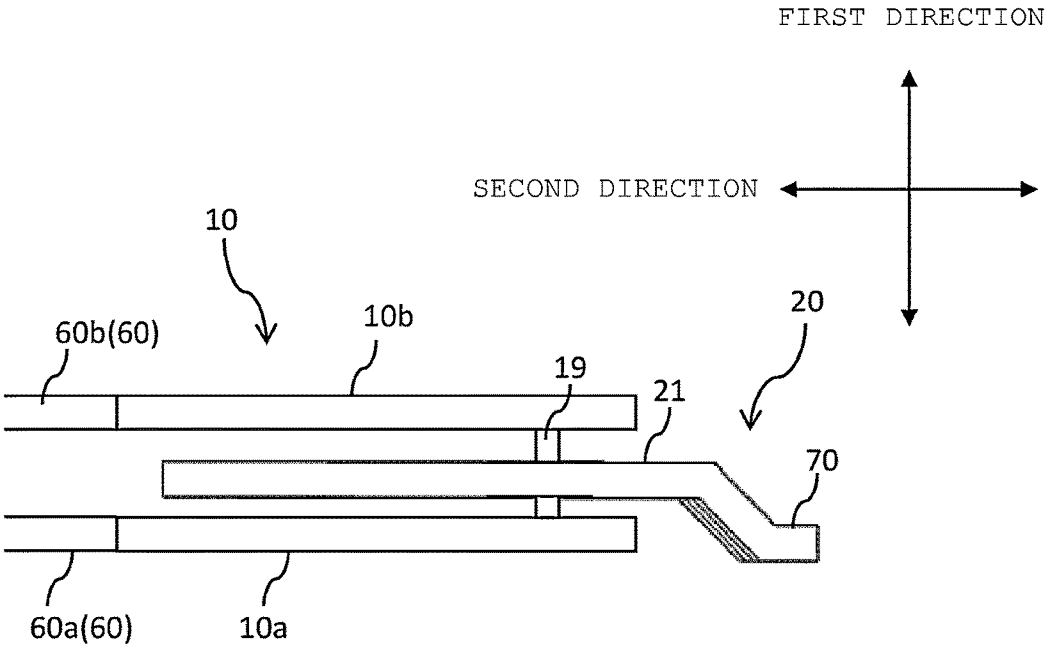
FIG. 3 is a side view in which the primary coil and a secondary coil that can be used in the first embodiment of the present invention are viewed along a third direction.

In the present embodiment, "one side" means an upper side in FIG. 3, and "another side" means a lower side in FIG. 3. An upward or downward direction in FIG. 3 is referred to as a "first direction", a leftward or rightward direction is referred to as a "second direction", and directions of front and reverse sides of paper are referred to as a "third direction". An in-plane direction including the second direction and the third direction is referred to as a "plane direction".

Figure 1:
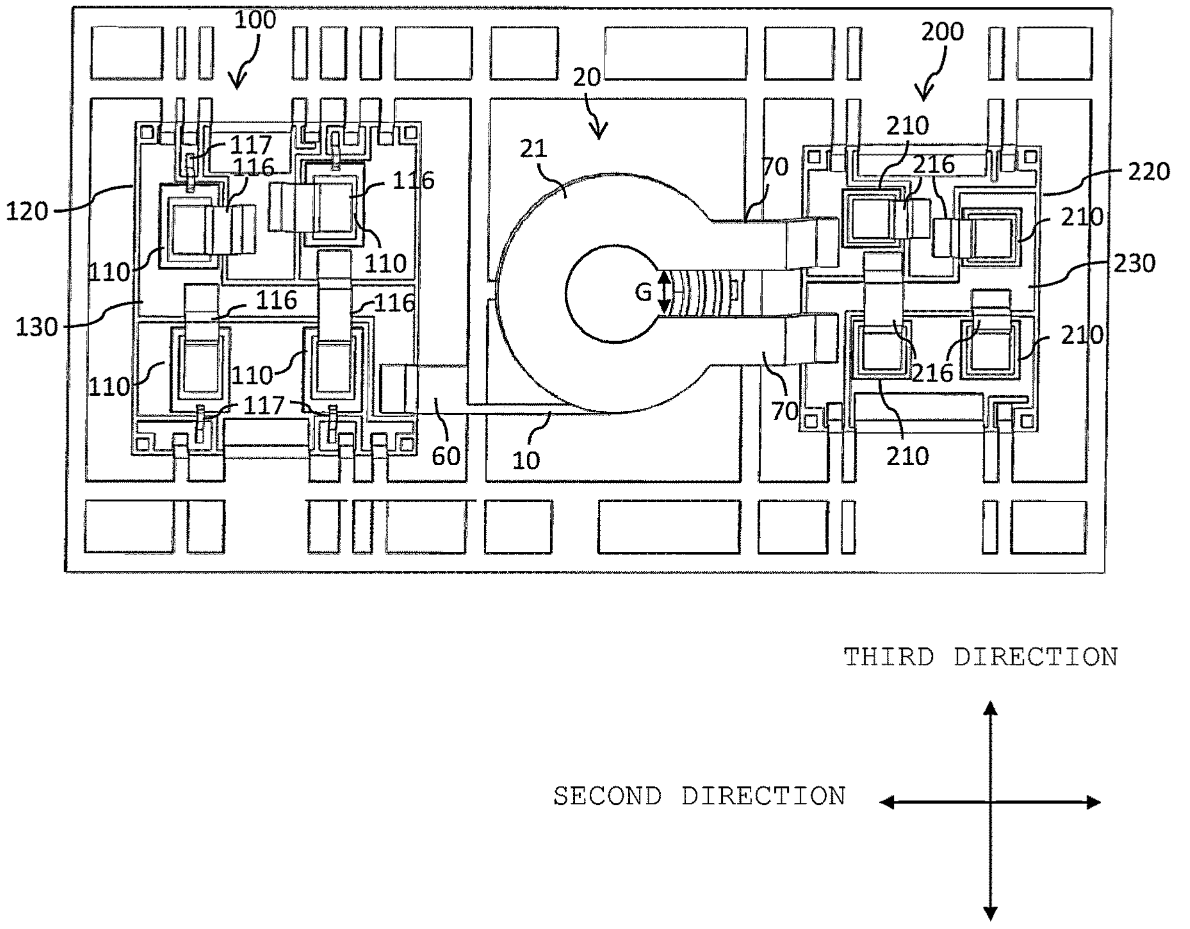
FIG. 1 is a plan view illustrating a state before an electronic device that can be used in a first embodiment of the present invention is separated from a lead frame.
Figure 2:
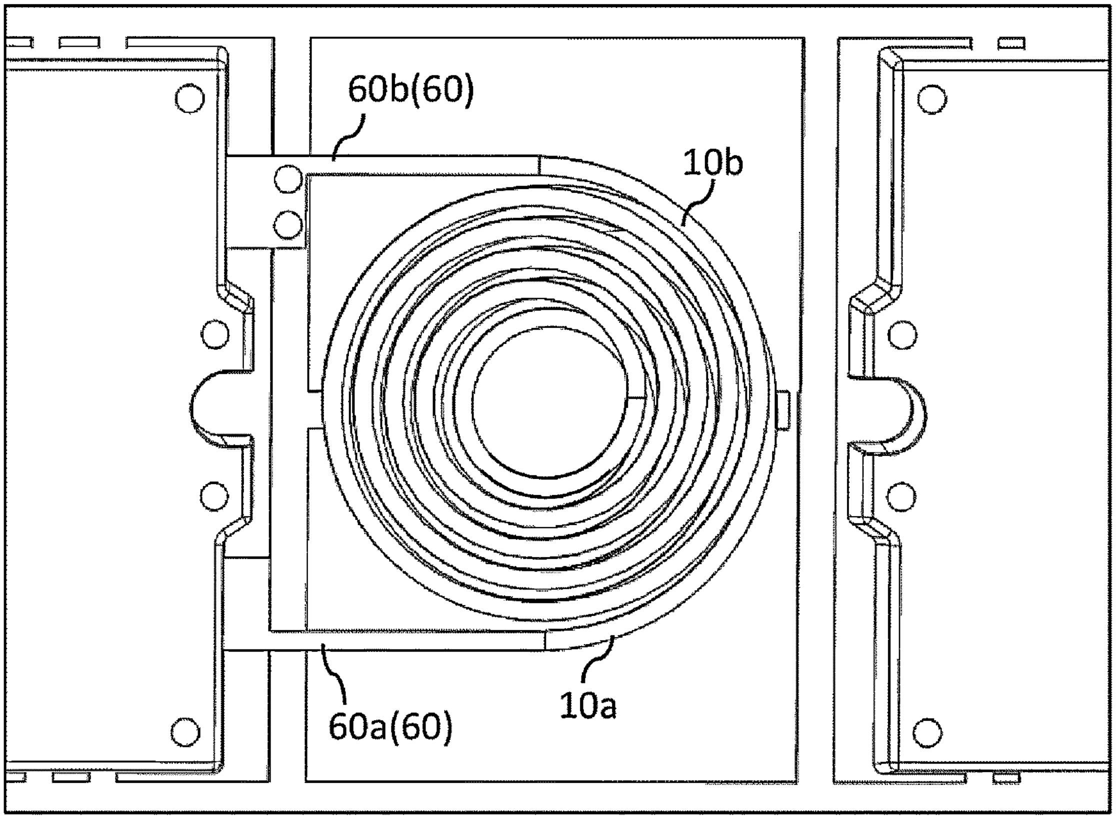
FIG. 2 is a plan view illustrating a primary coil that can be used in the first embodiment of the present invention.
Figure 4:
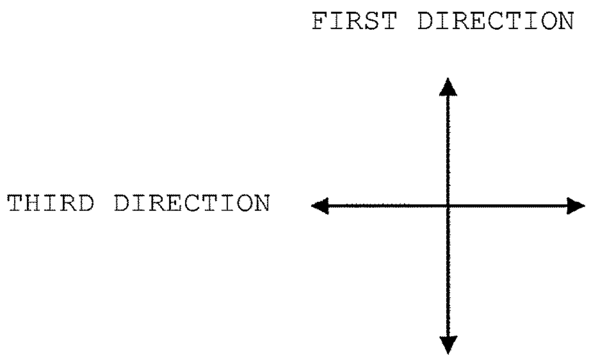
FIG. 4 is a side view in which the primary coil and the secondary coil that can be used in the first embodiment of the present invention are viewed along a second direction.
Figure 4:
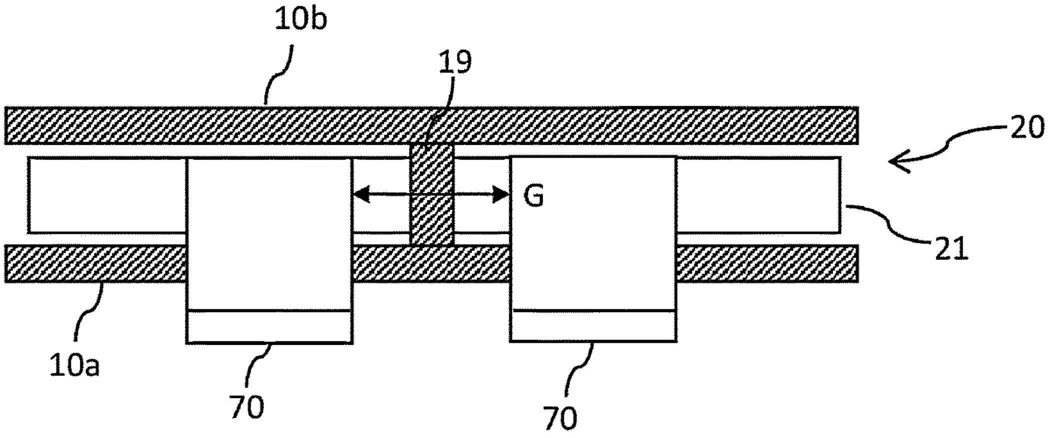

As illustrated in FIG. 1, an electronic device according to the present embodiment may have a primary coil 10, a secondary coil 20 that is disposed to face the primary coil 10, a primary-side electronic element 110 that is electrically connected to the primary coil 10, and a secondary-side electronic element 210 that is electrically connected to the secondary coil 20. As illustrated in FIGS. 2 and 3, the primary coil 10 may have a primary-side first coil 10*a* that is provided on another side of the secondary coil 20, and a primary-side second coil 10*b* that is provided on one side of the primary-side first coil 10*a*. As illustrated in FIG. 4, a connecting part 19 connecting the primary-side first coil 10*a* and the primary-side second coil 10*b* may be provided and may pass through a space in a plane direction of the primary-side second coil 10*b*. The primary coil 10 may be constituted of a lead frame. A thickness of the secondary coil 20 may be greater than a thickness of the primary coil 10.

Figure 6:
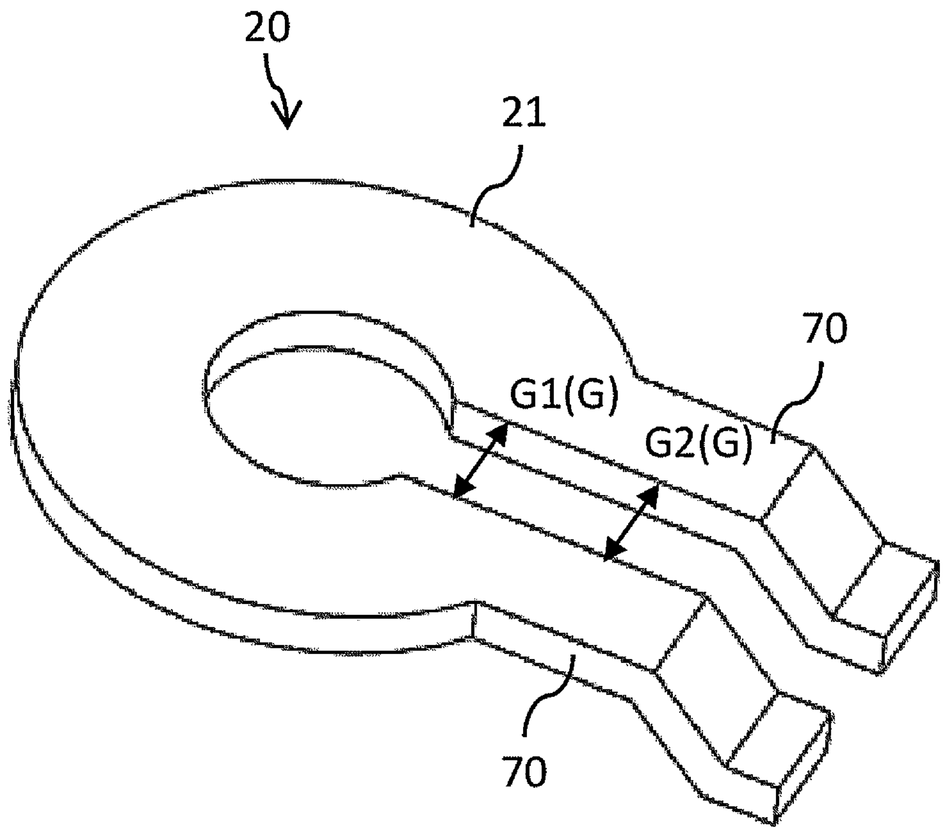
FIG. 6 is a perspective view illustrating the secondary coil that can be used in the first embodiment of the present invention.

As illustrated in FIG. 6, the secondary coil 20 may be provided with a gap G without being wound one turn or more. The secondary coil 20 may have a secondary coil part 21 and a pair of secondary-side extension parts 70 that extend from both ends of the secondary coil part 21 to be integrated with the secondary coil part 21, and may be provided with the gap G between the pair of secondary-side extension parts 70. As illustrated in FIGS. 3 and 4, the connecting part 19 may pass through the secondary coil 20 between both ends of the secondary coil part 21 or between the pair of the secondary-side extension parts 70. The connecting part 19 does not need to be completely parallel to the first direction, and may be inclined with respect to the first direction. An aspect of "extending along the first direction" also includes an aspect of extending to be inclined with respect to the first direction, as described above. Note that, in contrast to the aspect illustrated in FIGS. 3 and 4, the secondary coil 20 may be provided on the one side of the primary-side second coil 10*b*, or the secondary coil 20 may be provided on the other side of the primary-side first coil 10*a*.

Figure 5:
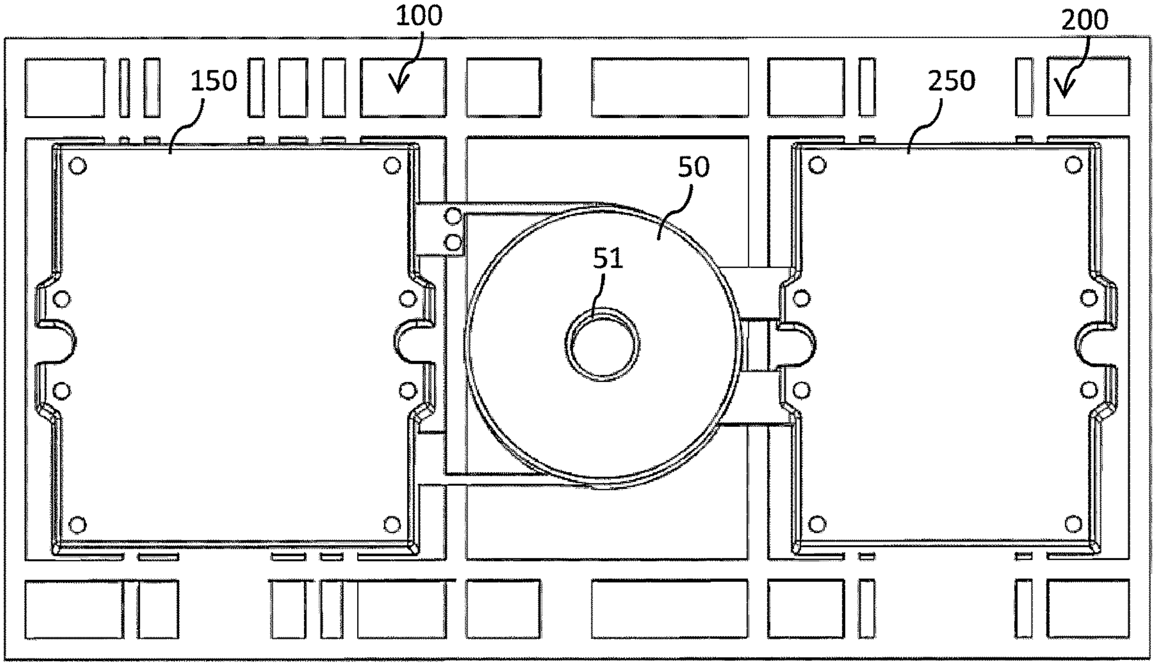
FIG. 5 is a plan view that illustrates a coil sealing part, a primary-side sealing part, and a secondary-side sealing part that can be used in the first embodiment of the present invention, and corresponds to FIG. 1.

As illustrated in FIG. 5, a coil sealing part 50 sealing the primary coil 10, the secondary coil 20, and the connecting part 19 and being made of sealing resin or the like may be provided.

A first electronic module 100 that has the primary-side electronic element 110 and the primary-side sealing part 150 may be provided. As illustrated in FIG. 1, the first electronic module 100 may have a primary-side substrate 120, a plurality of primary-side conductor layers 130 that is provided on one surface of the primary-side substrate 120, and a primary-side electronic element 110 that is provided on one surface of the primary-side conductor layer 130. The primary-side electronic element 110, a surface on the one side of the primary-side substrate 120, and a surface on the one side of the primary-side conductor layer 130 may be sealed with the primary-side sealing part 150 (see FIG. 5). The primary-side sealing part 150 may be constituted of primary-side sealing resin.

Figure 7:
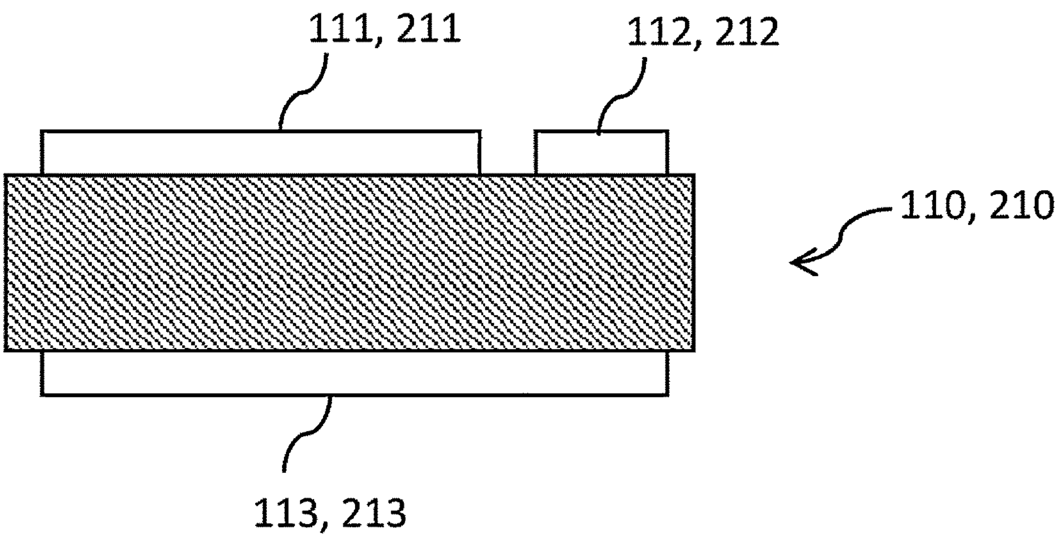
FIG. 7 is a side sectional view illustrating a primary-side electronic element and a secondary-side electronic element that can be used in the first embodiment of the present invention.

As illustrated in FIG. 7, a primary-side first electrode (for example, a source electrode) 111 and a primary-side second electrode (for example, a gate electrode) 112 may be provided on one surface of the primary-side electronic element 110, and a primary-side third electrode (for example, a drain electrode) 113 may be provided on another surface of the primary-side electronic element 110. The primary-side first electrode 111 and the primary-side conductor layer 130 may be connected via a primary-side first connector 116 (see FIG. 1) and a conductive adhesive (not illustrated) such as solder. The primary-side second electrode 112 and the primary-side conductor layer 130 may be connected via a primary-side second connector 117 (see FIG. 1) and a conductive adhesive such as solder. The primary-side third electrode 113 and the primary-side conductor layer 130 may be connected via a conductive adhesive such as solder. Furthermore, as illustrated in FIG. 8, the primary-side first electrode 111 may be provided on one surface of the primary-side electronic element 110, and the primary-side second electrode 112 may be provided on another surface of the primary-side electronic element 110.

As illustrated in FIG. 1, a second electronic module 200 that has the secondary-side electronic element 210 and the secondary-side sealing part 250 (see FIG. 5) may be provided. As illustrated in FIG. 1, the second electronic module 200 may have a secondary-side substrate 220, a plurality of secondary-side conductor layers 230 that is provided on one surface of the secondary-side substrate 220, and a secondary-side electronic element 210 that is provided on one surface of the secondary-side conductor layer 230. The secondary-side electronic element 210, a surface on the one side of the secondary-side substrate 220, and a surface on the one side of the secondary-side conductor layer 230 may be sealed with the secondary-side sealing part 250 (see FIG. 5). The secondary-side sealing part 250 may be constituted of secondary-side sealing resin. The primary-side sealing resin and the secondary-side sealing resin may be constituted of the same resin material, or may be constituted of resin materials that are different from each other.

Figure 8:
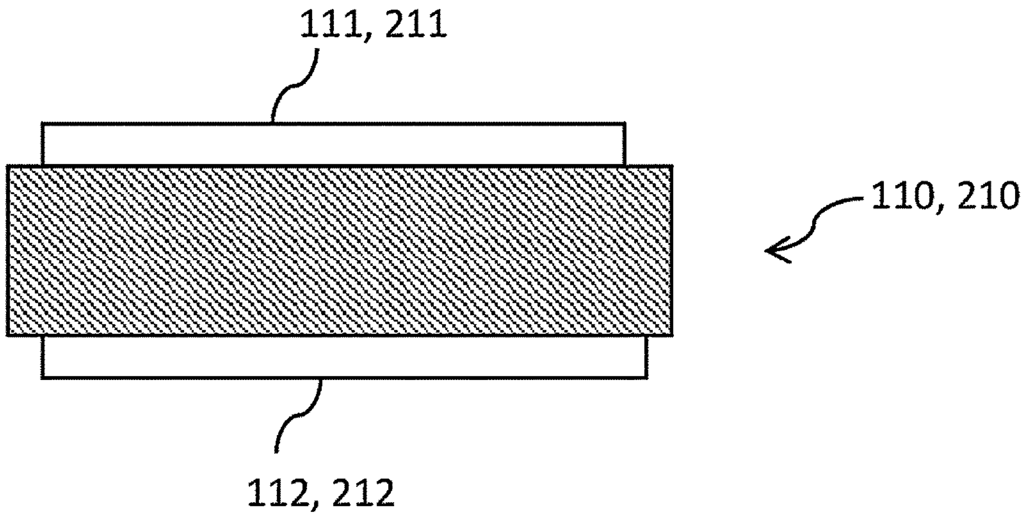
FIG. 8 is a side sectional view illustrating another aspect of the primary-side electronic element and the secondary-side electronic element that can be used in the first embodiment of the present invention.

As illustrated in FIG. 8, a secondary-side first electrode 211 may be provided on one surface of the secondary-side electronic element 210, and a secondary-side second electrode 212 may be provided on another surface of the secondary-side electronic element 210. The secondary-side first electrode 211 and the secondary-side conductor layer 230 may be connected via a secondary-side first connector 216 (see FIG. 1) and a conductive adhesive such as solder. Furthermore, as illustrated in FIG. 7, the secondary-side first electrode (for example, a source electrode) 211 and the secondary-side second electrode (for example, a gate electrode) 212 may be provided on one surface of the secondary-side electronic element 210, and a secondary-side third electrode (for example, a drain electrode) 213 may be provided on another surface of the secondary-side electronic element 210. The secondary-side third electrode 213 and the secondary-side conductor layer 230 may be connected via a conductive adhesive such as solder.

The primary-side first coil 10*a* and the primary-side second coil 10*b* of the primary coil 10 may have the same number of turns, or may have numbers of turns that are different from each other. As an example, each of the numbers of turns of the primary-side first coil 10*a* and the primary-side second coil 10*b* of the primary coil 10 may be 4.5. The number of turns of the secondary coil 20 may be 1, or may be 2 or more.

As illustrated in FIG. 2, the primary coil 10 and a primary-side extension part 60 that extends to an inside of the primary-side sealing part 150 may be integrated. The primary-side extension part 60 may have a primary-side first extension part 60*a*, and a primary-side second extension part 60*b* that is located on the one side relative to the primary-side first extension part 60*a*. The primary-side first coil 10*a* and the primary-side first extension part 60*a* may be integrated, and the primary-side second coil 10*b* and the primary-side second extension part 60*b* may be integrated.

Figure 9:
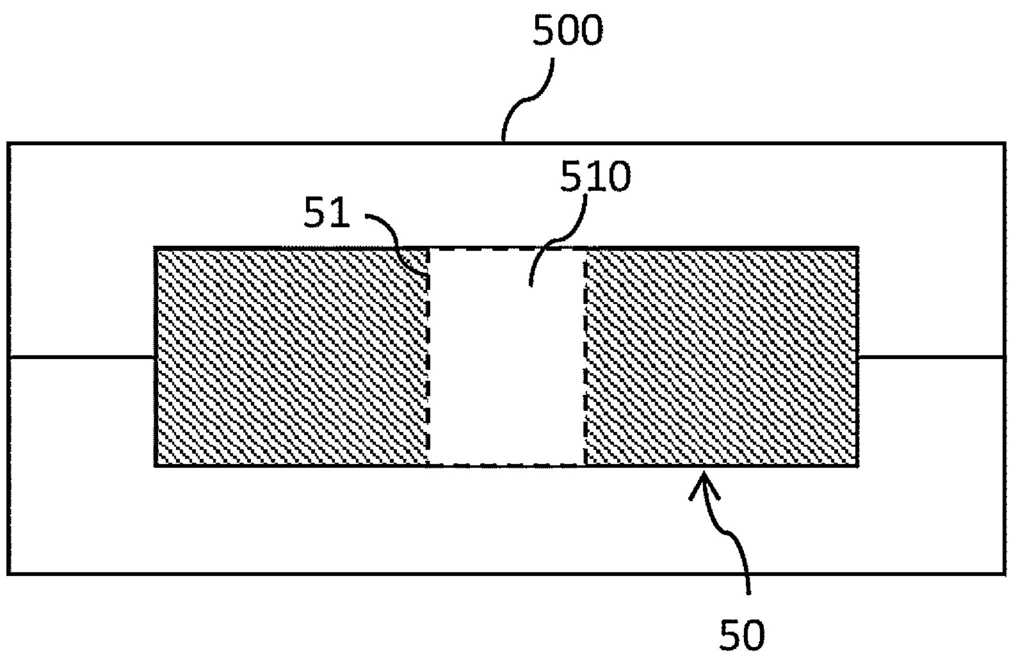
FIG. 9 is a side view illustrating a relationship between the coil sealing part and a core that can be used in the first embodiment of the present invention.

As illustrated in FIG. 9, a core 500 such as an E-core that passes through the primary coil 10 and the secondary coil 20 may be provided. The core 500 may have a leg part 510, and the leg part 510 may be provided to pass through an opening part 51 that is provided in the coil sealing part 50. The leg part 510 of the core 500 may be provided to abut onto an inner peripheral surface of the coil sealing part 50. An outer peripheral part of the core 500 may be provided to cover an outer periphery of the coil sealing part 50.

<<Effects>>

Next, an example of operations or effects according to the present embodiment having the configuration described above is described. All of the aspects described in the "Effects" can be employed in the configuration described above.

As illustrated in FIGS. 3 and 4, in a case where an aspect where the primary-side electronic element 110 that is electrically connected to the primary coil 10 and the secondary-side electronic element 210 that is electrically connected to the secondary coil 20 are provided, the primary coil 10 has the primary-side first coil 10*a* that is provided on the other side of the secondary coil 20, and the primary-side second coil 10*b* that is provided on the one side of the secondary coil 20, and the connecting part 19 connecting the primary-side first coil 10*a* and the primary-side second coil 10*b* is provided and passes through the secondary coil 20 has been employed, a wiring length between the primary-side electronic element 110 and the primary coil 10 can be reduced, a wiring length between the secondary-side electronic element 210 and the secondary coil 20 can be reduced, and a size of an electronic device can be reduced. Furthermore, the primary-side first coil 10*a* and the primary-side second coil 10*b* can be provided to sandwich the secondary coil 20, and therefore transmission efficiency in a transformer can also be enhanced.

In a case where an aspect in which the connecting part 19 passes through the secondary coil 20 between both ends of the secondary coil part 21 (see G1 of FIG. 6) or between the pair of secondary-side extension parts 70 (see G2 of FIG. 6) has been employed, there is an advantage in which the primary-side first coil 10*a* and the primary-side second coil 10*b* can be connected by using a connecting part 19 having a short length.

As illustrated in FIG. 5, in a case where an aspect in which the coil sealing part 50 with which the primary coil 10 and the secondary coil 20 are sealed and that is made of sealing resin is provided has been employed, an insulating sheet that has been conventionally used does not need to be provided, and as a result, a space that is inevitably formed between insulating sheets can be omitted. Therefore, thermal conductivity can be increased, and heat dissipation can be enhanced.

As illustrated in FIG. 2, in a case where an aspect in which the primary-side first coil 10*a* of the primary coil 10 and the primary-side extension part 60 that extends to the inside of the primary-side sealing part 150 are integrated has been employed, there is an advantage in which a member in which the primary coil 10 and the primary-side extension part 60 are integrated can be easily manufactured, by forming the primary coil 10 and the primary-side extension part 60 in a member such as a lead frame and removing an unnecessary portion.

As illustrated in FIG. 1, in a case where an aspect in which the secondary coil 20 and the secondary-side extension parts 70 that extend to the inside of the secondary-side sealing part 250 are integrated has been employed, a member in which the secondary coil 20 and the secondary-side extension parts 70 are integrated can be easily manufactured, by forming the secondary coil 20 and the secondary-side extension parts 70 in a member such as a lead frame and removing an unnecessary portion.

Figure 10:
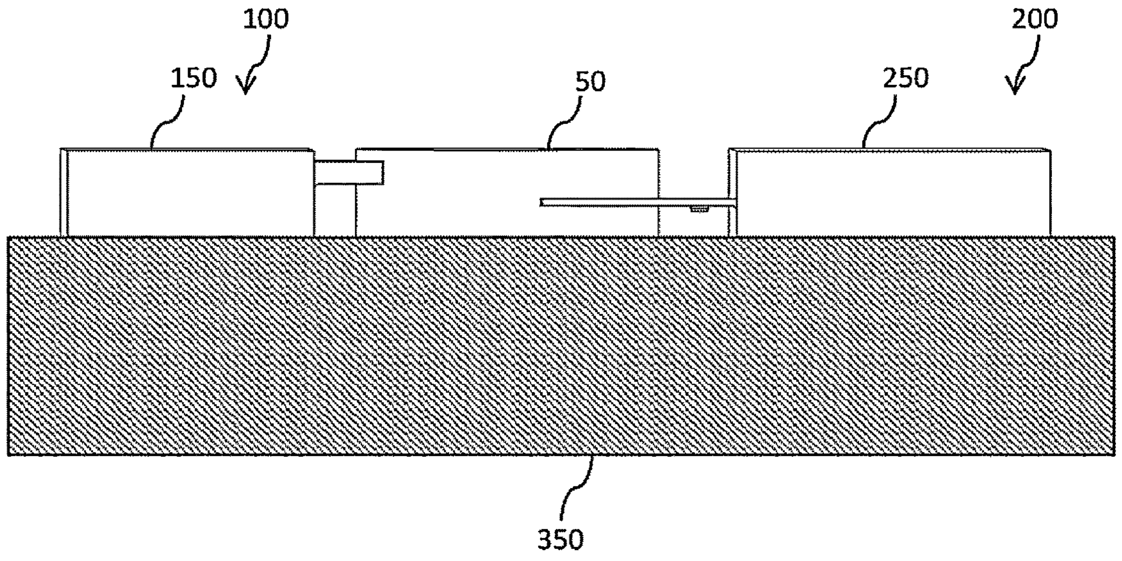
FIG. 10 is a side view illustrating a relationship between the coil sealing part, the primary-side sealing part, and the secondary-side sealing part, and a cooling body that can be used in the first embodiment of the present invention.

As illustrated in FIG. 10, a cooling body such as a heat sink may be provided on another surface (a back surface) of the coil sealing part 50, another surface (a back surface) of the primary-side sealing part 150, and another surface (a back surface) of the secondary-side sealing part 250. In a case where such an aspect has been employed, there is an advantage in which the coil sealing part 50, the primary-side sealing part 150, and the secondary-side sealing part 250 can be cooled down by the cooling body.

Second Embodiment

Next, a second embodiment of the present invention is described.

Figure 11:
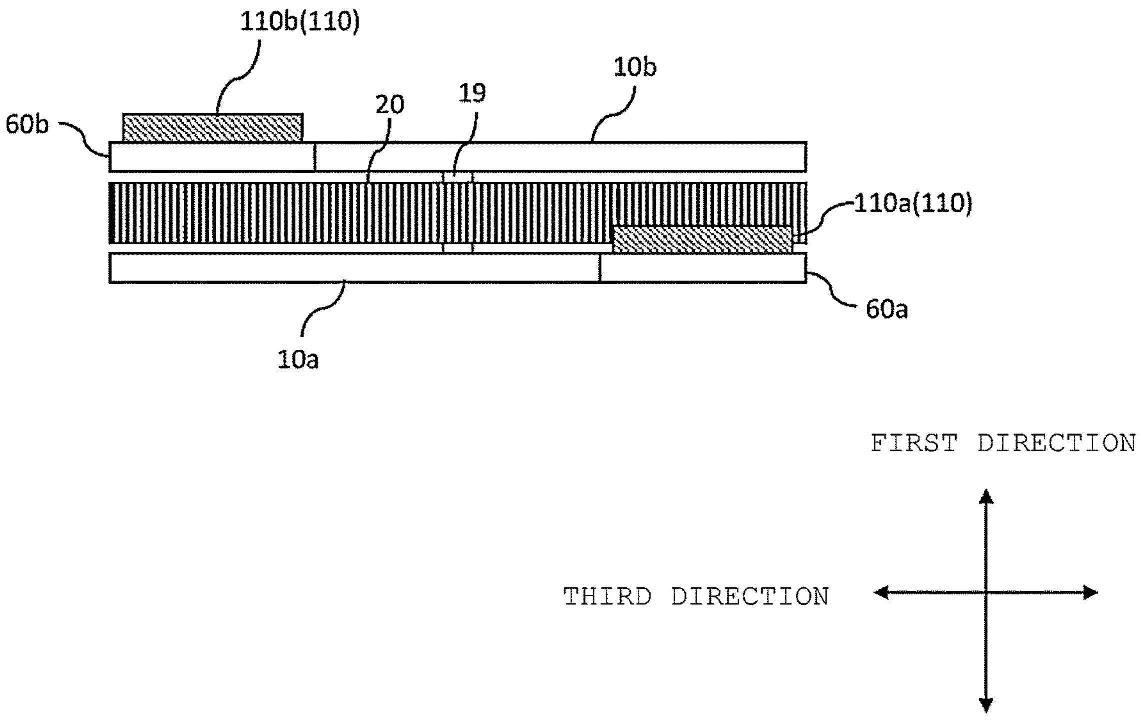
FIG. 11 is a side view illustrating an aspect on a side of a first electronic module that can be used in a second embodiment of the present invention.

In the present embodiment, as illustrated in FIG. 11, the primary-side electronic element 110 has a primary-side first electronic element 110*a*, and a primary-side second electronic element 110*b* that is provided on the one side relative to the primary-side first electronic element 110*a*. The primary-side first electronic element 110*a* may be provided on the primary-side first extension part 60*a* that extends from the primary-side first coil 10*a*, and may be electrically connected to the primary-side first coil 10*a*. The primary-side second electronic element 110*b* may be provided on the primary-side second extension part 60*b* that extends from the primary-side second coil 10*b*, and may be electrically connected to the primary-side second coil 10*b*. The other configuration is similar to a configuration in the first embodiment, and all of the aspects described in the first embodiment can be employed. The members described in the first embodiment are described by using the same reference signs.

The primary-side electronic element 110 may be sealed with the primary-side sealing part 150. The secondary-side electronic element 210 may be sealed with the secondary-side sealing part 250.

As described above, an aspect in which the primary-side first electronic element 110*a* is provided on the primary-side first extension part 60*a* that extends from the primary-side first coil 10*a* to an outside of the coil sealing part 50 may be employed. In this case, wiring length can be further reduced, and the size of the electronic device can be reduced. Similarly, an aspect in which the primary-side second electronic element 110*b* is provided on the primary-side second extension part 60*b* that extends from the primary-side second coil 10*b* to the outside of the coil sealing part 50 may be employed. In this case, similarly, wiring length can be further reduced, and the size of the electronic device can be reduced. The primary-side first electronic element 110*a* may be provided on the primary-side first extension part 60*a* via a conductive adhesive such as solder, and the primary-side second electronic element 110*b* may be provided on the primary-side second extension part 60*b* via a conductive adhesive such as solder.

Furthermore, the primary-side first extension part 60*a* and the primary-side second extension part 60*b* are provided on the other side and the one side of the secondary-side coil 20, and the primary-side first extension part 60*a* and the primary-side second extension part 60*b* are disposed to be spaced apart from each other in the first direction. This can suppress an influence of noise or the like that occurs from the primary-side first electronic element 110*a* that is provided on one surface of the primary-side first extension part 60*a* on the primary-side second electronic element 110*b* that is provided on one surface of the primary-side second extension part 60*b*, or in contrast, an influence of noise or the like that occurs from the primary-side second electronic element 110*b* on the primary-side first electronic element 110*a*. Furthermore, as illustrated in FIG. 11, in a case where the primary-side first extension part 60*a* and the primary-side second extension part 60*b* are located on opposite sides across the connecting part 19, when viewed from the second direction, there is further an advantage in which the primary-side first extension part 60*a* and the primary-side second extension part 60*b* can be disposed to be spaced apart from each other.

Figure 12:
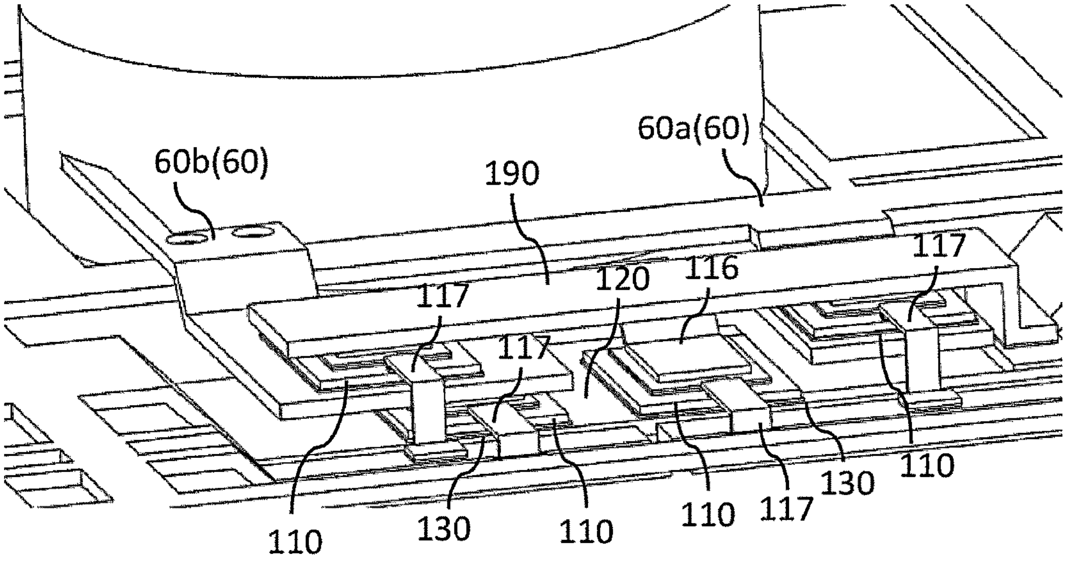
FIG. 12 is a perspective view illustrating an aspect that can be used in the second embodiment of the present invention, and is different from the aspect illustrated in FIG. 11.

As illustrated in FIG. 12, the primary-side electronic element 110 may be provided on each of the one side and the other side of the primary-side extension part 60. A primary-side connecting body 190 that connects a plurality of primary-side electronic elements 110 that is provided on the one side of the primary-side extension part 60 may be provided. As an example, a primary-side first electrode (for example, a source electrode) 111 (see FIG. 7) of a primary-side electronic element 110 that is located on the other side of the primary-side extension part 60 and a primary-side third electrode (for example, a drain electrode) 113 (see FIG. 7) of a primary-side electronic element 110 that is located on the one side of the primary-side extension part 60 may be electrically connected by the primary-side extension part 60 (see two primary-side electronic elements 110 that are located on a left-hand side in FIG. 12). Furthermore, primary-side first electrodes (for example, source electrodes) 111 (see FIG. 7) of a plurality of primary-side electronic elements 110 that is located on the one side of the primary-side extension part 60 may be electrically connected by the primary-side connecting body 190 (see a primary-side electronic element 110 that is located on a leftmost side and a primary-side electronic element 110 that is located on a rightmost side in FIG. 12).

Third Embodiment

Next, a third embodiment of the present invention is described.

Figure 13:
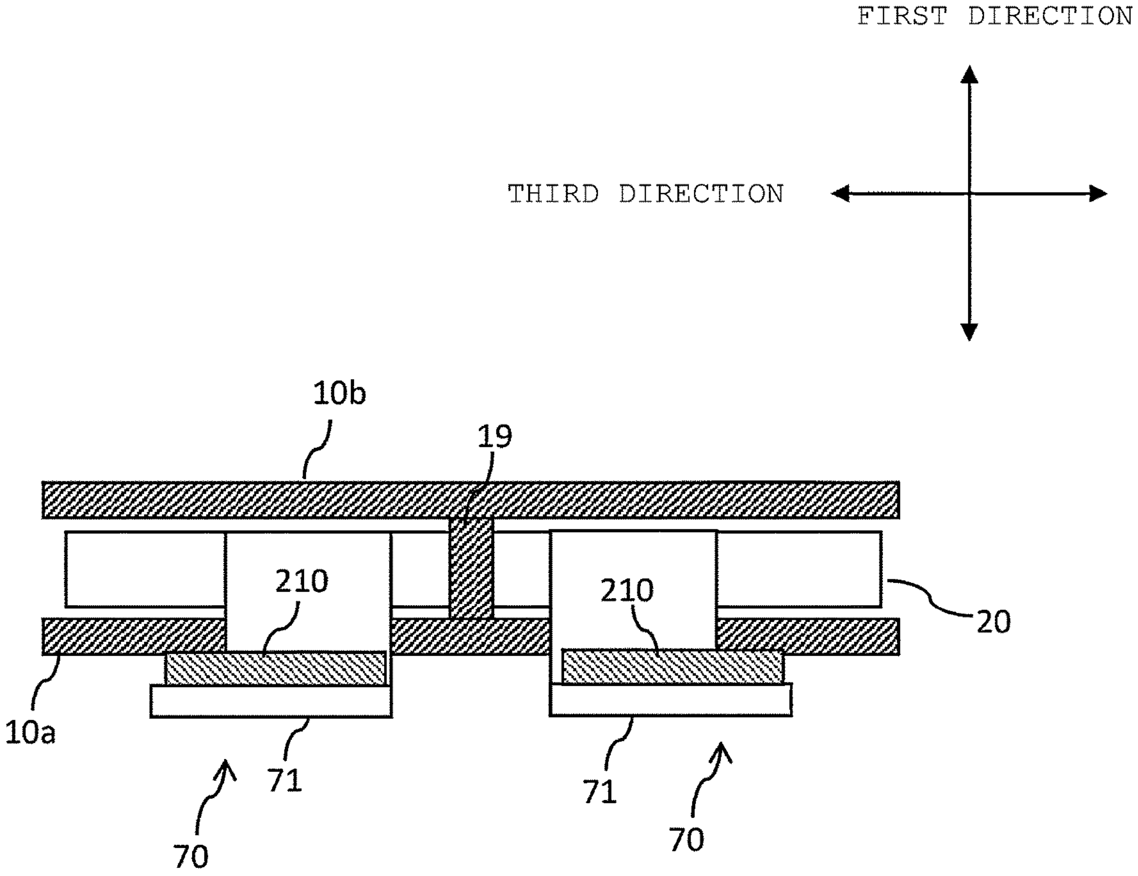
FIG. 13 is a side view illustrating an aspect on a side of a first electronic module that can be used in a third embodiment of the present invention.

In the present embodiment, as illustrated in FIG. 13, an aspect in which the secondary-side electronic element 210 is provided on the secondary-side extension part 70 that extends from the secondary coil 20 to the outside of the coil sealing part 50 is employed. The other configuration is similar to a configuration in the first embodiment or the second embodiment, and all of the aspects described in each of the embodiments described above can be employed. The members described in each of the embodiments described above are described by using the same reference signs.

In a case where an aspect in which the secondary-side electronic element 210 is provided on the secondary-side extension part 70 that extends from the secondary coil 20 to the outside of the coil sealing part 50, as in the present embodiment, has been employed, wiring length can be further reduced, and the size of the electronic device can be reduced. The secondary-side electronic element 210 may be provided on the secondary-side extension part 70 via a conductive adhesive such as solder. As illustrated in FIG. 13, a widthwise length of a base end 71 of the secondary-side extension part 70 may be longer in the third direction than a widthwise length of the secondary-side electronic element 210, and the secondary-side electronic element 210 may be placed on the base end 71.

Figure 14:
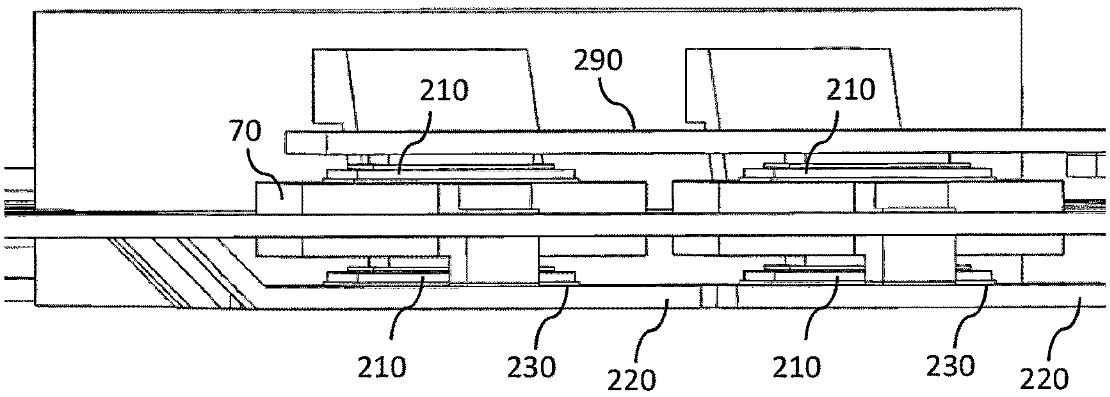
FIG. 14 is a perspective view illustrating an aspect that can be used in the third embodiment of the present invention, and is different from the aspect illustrated in FIG. 11.

As illustrated in FIG. 14, the secondary-side electronic element 210 may be provided on each of the one side and the other side of the secondary-side extension part 70. A secondary-side connecting body 290 that connects a plurality of secondary-side electronic elements 210 that is provided on the one side of the secondary-side extension part 70 may be provided. As an example, a secondary-side first electrode (for example, a source electrode) 211 (see FIG. 7) of a secondary-side electronic element 210 that is located on the other side of the secondary-side extension part 70 and a secondary-side third electrode (for example, a drain electrode) 213 (see FIG. 7) of a secondary-side electronic element 210 that is located on the one side of the secondary-side extension part 70 may be electrically connected by the secondary-side extension part 70 (see two secondary-side electronic elements 210 that are disposed in an upward or downward direction in FIG. 14). Furthermore, secondary-side first electrodes (for example, source electrodes) 211 (see FIG. 7) of a plurality of secondary-side electronic elements 210 that is located on the one side of the secondary-side extension part 70 may be electrically connected by the secondary-side connecting body 290 (see two secondary-side electronic elements 210 that are disposed on left-hand and right-hand sides on an upper side in FIG. 14).

Fourth Embodiment

Next, a fourth embodiment of the present invention is described.

Figure 15:
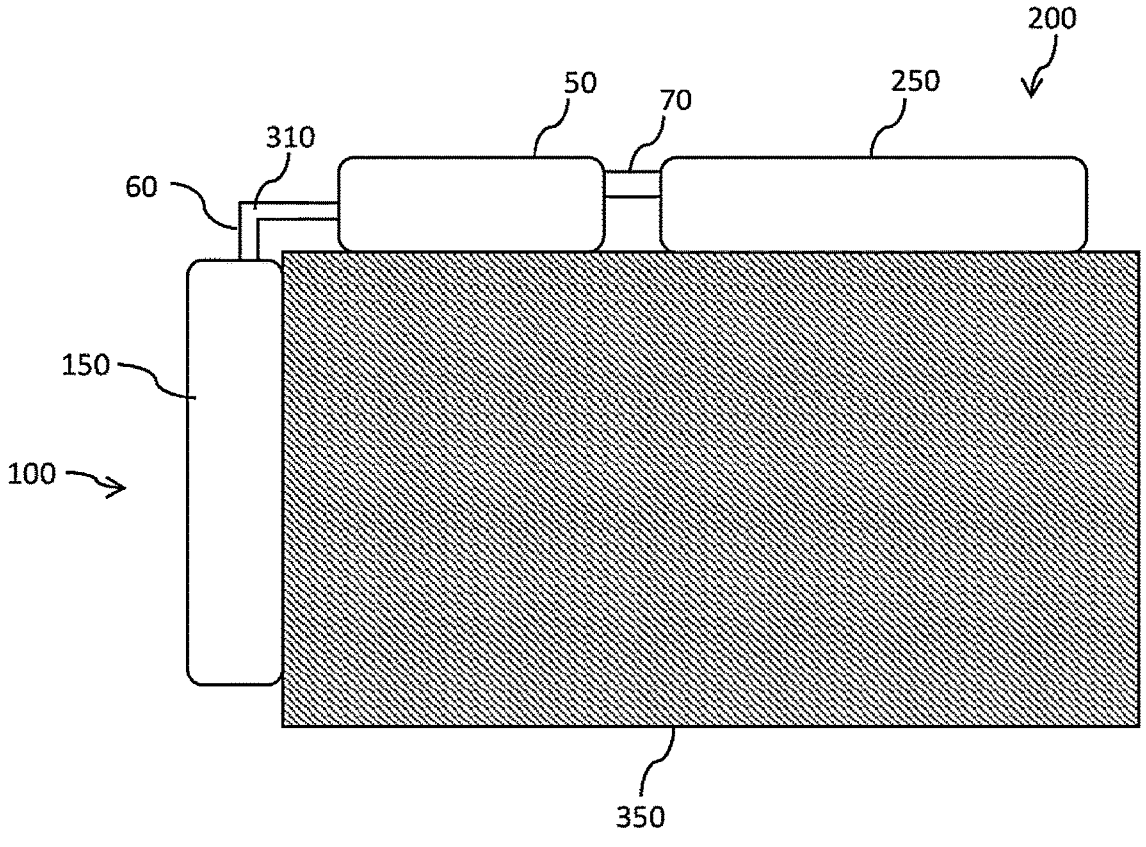
FIG. 15 is a side view illustrating a relationship between a coil sealing part, a primary-side sealing part, and a secondary-side sealing part, and a cooling body that can be used in a fourth embodiment of the present invention.

As illustrated in FIG. 15, in the present embodiment, an aspect in which a first bent part 310 is provided in the primary-side extension part 60 between the coil sealing part 50 and the primary-side sealing part 150 is employed. The other configuration is similar to configurations in the first to third embodiments, and all of the aspects described in each of the embodiments described above can be employed. The members described in each of the embodiments described above are described by using the same reference signs.

According to the present embodiment, the coil sealing part 50 and the secondary-side sealing part 250 can be disposed along a plane direction, and the primary-side sealing part 150 can be disposed along a direction that is bent by a predetermined angle (for example, 60 degrees, 90 degrees, 120 degrees, or the like) with respect to the plane direction. Therefore, a size in a certain plane direction can be reduced.

Furthermore, such bending enables a reduction in an influence of noise or the like generated in the primary-side electronic element 110 sealed with the primary-side sealing part 150 on the secondary-side electronic element 210 sealed with the secondary-side sealing part 250, and also enables a reduction in an influence of noise or the like generated in the secondary-side electronic element 210 on the secondary-side electronic element 210 sealed with the primary-side sealing part 150.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350.

Fifth Embodiment

Next, a fifth embodiment of the present invention is described.

Figure 16:
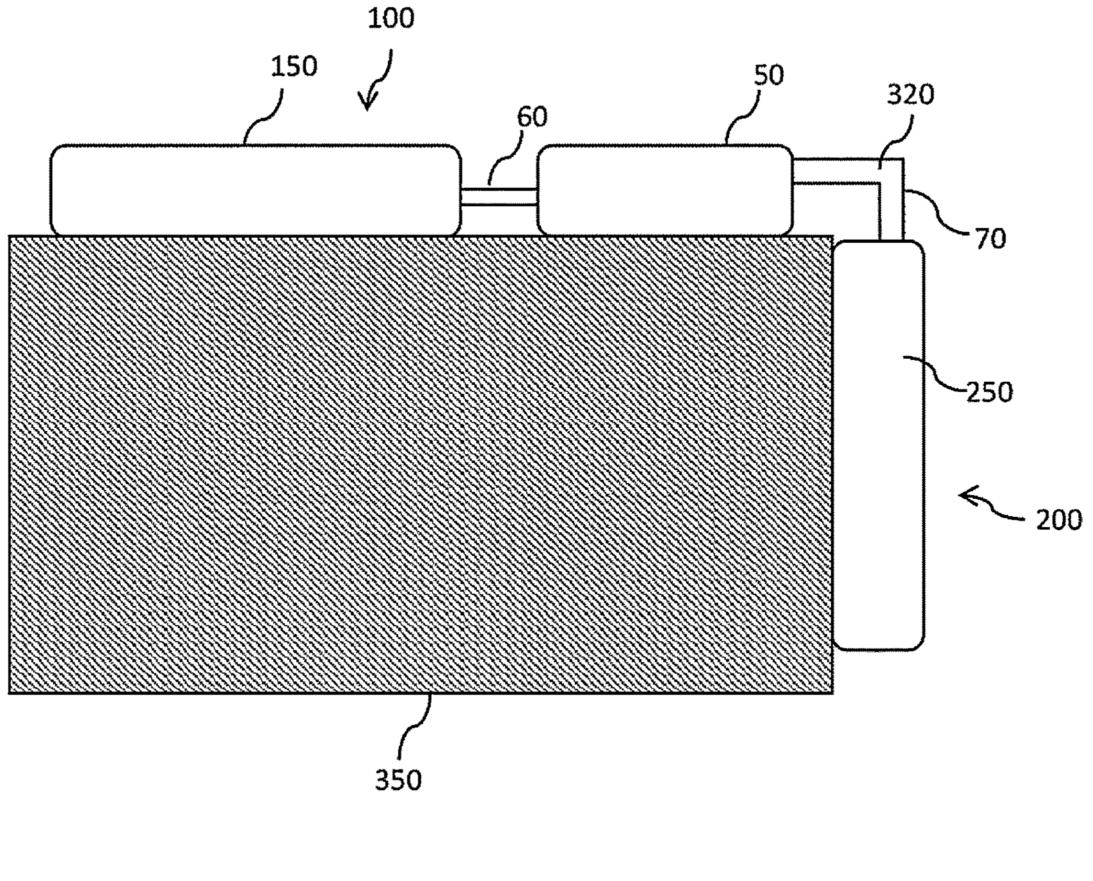
FIG. 16 is a side view illustrating a relationship between a coil sealing part, a primary-side sealing part, and a secondary-side sealing part, and a cooling body that can be used in a fifth embodiment of the present invention.

As illustrated in FIG. 16, in the present embodiment, an aspect in which a second bent part 320 is provided in the secondary-side extension part 70 between the coil sealing part 50 and the secondary-side sealing part 250 is employed. The other configuration is similar to configurations in the first to third embodiments, and all of the aspects described in each of the embodiments described above can be employed. The members described in each of the embodiments described above are described by using the same reference signs.

According to the present aspect, the coil sealing part 50 and the primary-side sealing part 150 can be disposed along a plane direction, and the secondary-side sealing part 250 can be disposed along a direction that is bent by a predetermined angle (for example, 60 degrees, 90 degrees, 120 degrees, or the like) with respect to the plane direction. Therefore, a size in a certain plane direction can be reduced.

Furthermore, such bending enables a reduction in an influence of noise or the like generated in the primary-side electronic element 110 sealed with the primary-side sealing part 150 on the secondary-side electronic element 210 sealed with the secondary-side sealing part 250, and also enables a reduction in an influence of noise or the like generated in the secondary-side electronic element 210 on the secondary-side electronic element 210 sealed with the primary-side sealing part 150.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350.

Sixth Embodiment

Next, a sixth embodiment of the present invention is described.

Figure 17:
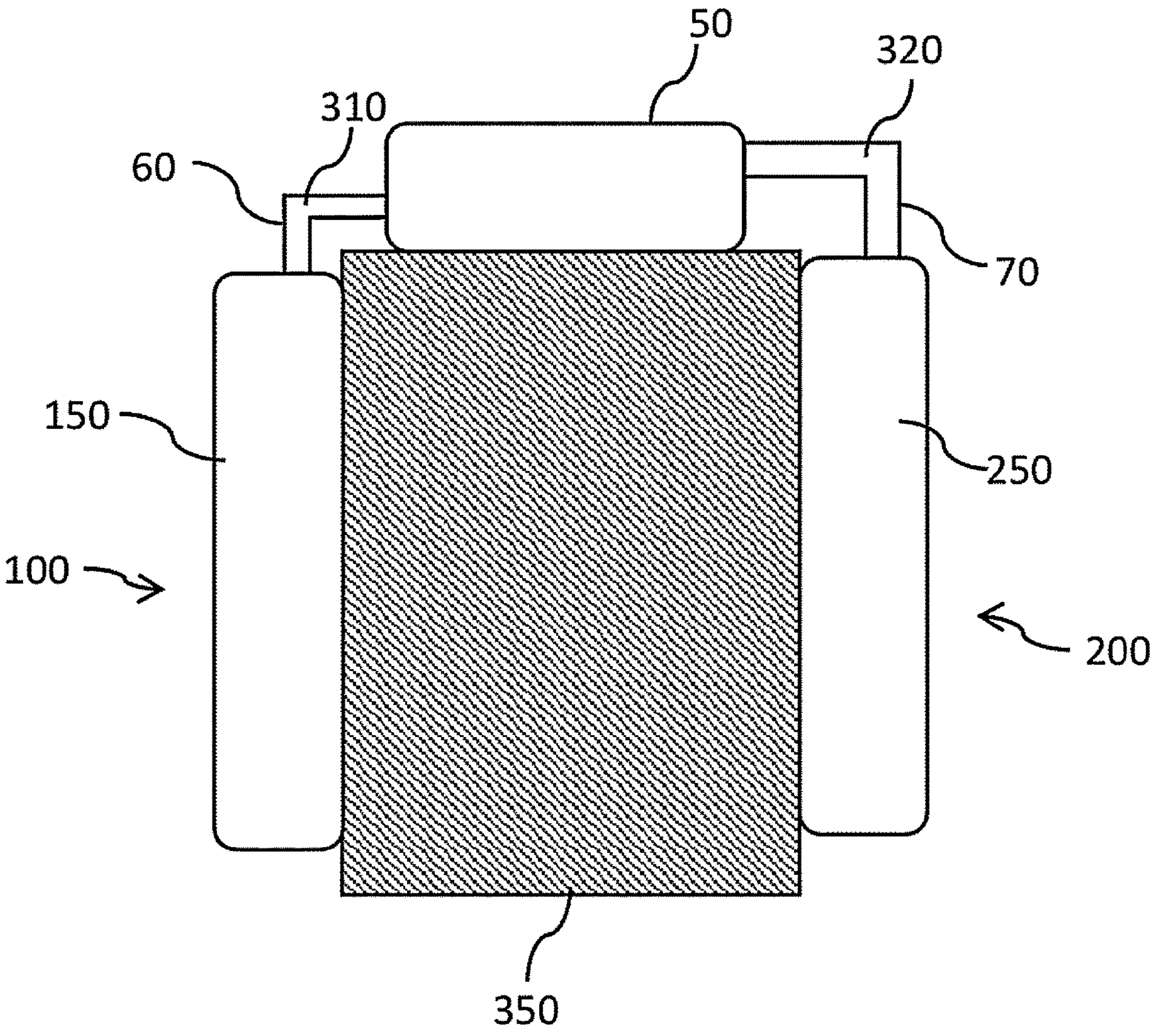
FIG. 17 is a side view illustrating a relationship between a coil sealing part, a primary-side sealing part, and a secondary-side sealing part, and a cooling body that can be used in a sixth embodiment of the present invention.

As illustrated in FIG. 17, in the present embodiment, an aspect in which the first bent part 310 is provided in the primary-side extension part 60 between the coil sealing part 50 and the primary-side sealing part 150 and the second bent part 320 is provided in the s secondary-side extension part 70 between the coil sealing part 50 and the secondary-side sealing part 250 is employed. The other configuration is similar to a configuration in the first to third embodiments, and all of the aspects described in each of the embodiments described above can be employed. The members described in each of the embodiments described above are described by using the same reference signs.

According to the present embodiment, the coil sealing part 50, the primary-side sealing part 150, and the secondary-side sealing part 250 can be respectively disposed along plane directions that are different from each other. Furthermore, the primary-side sealing part 150 and the secondary-side sealing part 250 can also be disposed in such a way that respective back surfaces face each other. The coil sealing part 50 and the primary-side sealing part 150 may be disposed to be bent by a first angle (for example, 60 degrees, 90 degrees, 120 degrees, or the like) with respect to each other, and the coil sealing part 50 and the secondary-side sealing part 250 may be disposed to be bent by a second angle (for example, 60 degrees, 90 degrees, 120 degrees, or the like) with respect to each other.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350. As an example, in a case where, for example, an aspect in which the coil sealing part 50 and the primary-side sealing part 150 are disposed to be bent by 90 degrees with respect to each other and the coil sealing part 50 and the secondary-side sealing part 250 are disposed to be bent by 90 degrees with respect to each other has been employed, disposition can be performed in such a way that the back surface of the coil sealing part 50, the back surface of the primary-side sealing part 150, and the back surface of the secondary-side sealing part 250 respectively abut onto three surfaces of the cooling body 350 that is made of a heat sink or the like, and there is an advantage in which a high cooling effect can be expected.

Figure 18:
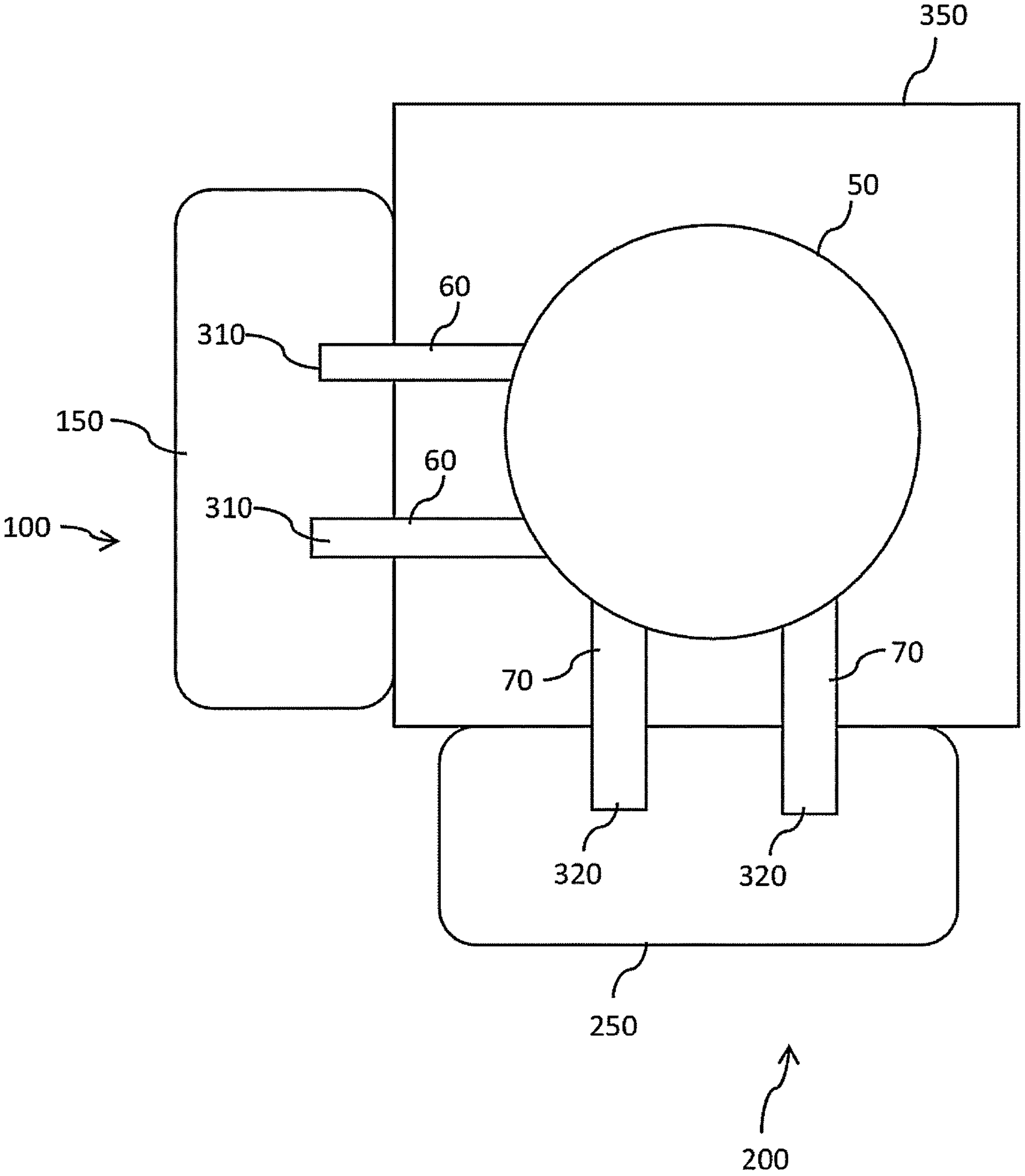
FIG. 18 is a plan view illustrating an example of a disposition aspect of a primary-side sealing part and a secondary-side sealing part that can be used in an embodiment of the present invention.

The primary-side terminal 60 and the secondary-side terminal 70 do not need to be provided linearly. For example, the primary-side terminal 60 and the secondary-side terminal 70 may be provided to be orthogonal to each other in a plane direction, or may be provided to cross each other at an angle that is different from 90 degrees in the plane direction. FIG. 18 illustrates an aspect in which the primary-side terminal 60 and the secondary-side terminal 70 are orthogonal to each other in the plane direction. As described above, according to the present embodiment, the primary-side sealing part 150 and the secondary-side sealing part 250 can be disposed in any direction of the plane direction, and can be bent by using the first bent part 310 and the second bent part 320.

The description of each embodiment and the disclosure of the drawings described above are merely examples for explaining the invention described in the claims, and the invention described in the claims is not limited by the description of the embodiment or the disclosure of the drawings described above. In addition, the recitation of the claims at the original application is merely an example, and the description of the claims can be appropriately changed based on the description of the specification, the drawings, and the like.

REFERENCE SIGNS LIST

10 Primary coil
10*a* Primary-side first coil
10*b* Primary-side second coil
19 Connecting part
20 Secondary coil
21 Secondary coil part
50 Coil sealing part
60 Primary-side terminal
70 Secondary-side terminal
110 Primary-side electronic element
110*a* Primary-side first electronic element
110*b* Primary-side second electronic element
150 Primary-side sealing part
210 Secondary-side electronic element

The invention claimed is:

1. An electronic device comprising:
a primary coil;
a secondary coil disposed to face the primary coil;
a primary-side electronic element electrically connected to the primary coil;
a secondary-side electronic element electrically connected to the secondary coil; and
a coil sealing part sealing the primary coil and the secondary coil, wherein
the primary coil comprises a primary-side first coil that is provided on another side of the secondary coil, and a primary-side second coil that is provided on one side of the primary-side first coil,
a connecting part connecting the primary-side first coil and the primary-side second coil is provided and configured to pass through a space of the secondary coil,
the primary-side electronic element comprises primary-side first electronic element and a primary-side second electronic element provided on one side relative to the primary-side first electronic element, and
the primary-side first electronic element is provided on a surface of a primary-side first extension part extending from the primary-side first coil and protruding outside the coil sealing part, and the primary-side first electronic element is electrically connected to the primary-side first coil; or the primary-side second electronic element is provided on a surface of a primary-side second extension part extending from the primary-side second coil and protruding outside the coil sealing part, and the primary-side second electronic element is electrically connected to the primary-side second coil.

2. The electronic device according to claim 1, wherein
the secondary coil comprises a secondary coil part and a pair of secondary-side extension parts that are configured to extend from both ends of the secondary coil part, and
the connecting part is configured to pass through the space of the secondary coil between the both ends of the secondary coil part or between the pair of the secondary-side extension parts.

3. The electronic device according to claim 1,
wherein the coil sealing part is configured to seal the primary coil, the secondary coil, and the connecting part.

4. The electronic device according to claim 1 further comprising a primary-side sealing part sealing the primary-side electronic element, or a secondary-side sealing part sealing the secondary-side electronic element.

5. The electronic device according to claim 1 further comprising a first electronic module having a primary-side substrate and the primary-side electronic element, or a second electronic module having a secondary-side substrate and the secondary-side electronic element.

6. The electronic device according to claim 1, wherein the primary-side first coil or the primary-side second coil is made from a lead frame.

* * * * *